June 16, 1964   A. G. MAKOWSKI   3,137,748
HOLLOW PLASTIC ARTICLE AND PROCESS OF MAKING
Filed May 2, 1960   4 Sheets-Sheet 1

INVENTOR.
ALEXANDER GEORGE MAKOWSKI

BY Russell L. Root
George W. Reiber
ATTORNEYS

June 16, 1964 A. G. MAKOWSKI 3,137,748
HOLLOW PLASTIC ARTICLE AND PROCESS OF MAKING
Filed May 2, 1960 4 Sheets-Sheet 2

INVENTOR.
ALEXANDER GEORGE MAKOWSKI
BY Russell L. Root
George W. Reiber
ATTORNEYS

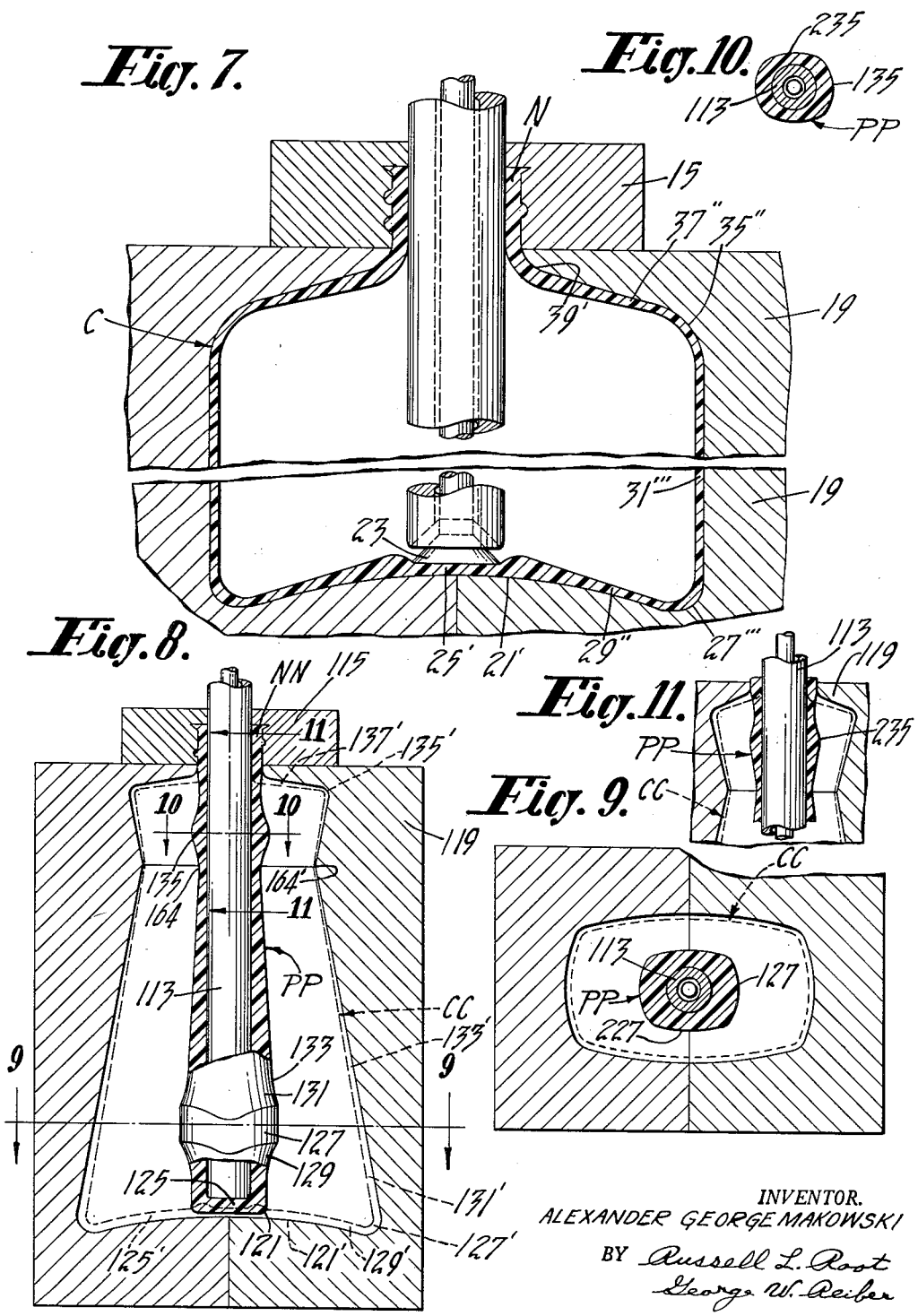

3,137,748
HOLLOW PLASTIC ARTICLE AND PROCESS OF MAKING
Alexander George Makowski, Fayville, Mass., assignor to American Can Company, New York, N.Y., a corporation of New Jersey
Filed May 2, 1960, Ser. No. 26,014
5 Claims. (Cl. 264—97)

This invention relates to a method for forming thin-walled hollow articles of organic plastic materials by the steps of injection molding to form a preform or parison and subsequently expanding the parison by fluid pressure to the desired contour. The invention further relates to a novel parison, and a novel article resulting therefrom.

In the art of forming organic plastic articles, it has been the most common practice to extrusion mold a tubular parison by forcing the plastic material through a nozzle or die into the open air or into a space which is unconfined or only partly confined by molding surfaces to form an intermediate blank. The blank is then disposed within a blow mold wherein the blank is expanded to the shape of the enclosing mold. However, since in such a process the plastic material is not confined, the blank will naturally not be formed to a predetermined size and shape and consequently the blown article in most cases demonstrates a wide variation in wall thickness. Furthermore, in such a process a substantialy excess of plastic material is used, thereby increasing the cost per unit.

To avoid the disadvantages of the extrusion molding process, attempts have been made to employ another method of manufacture. This method involves forming a preform or parison by injecting plastic material into a cavity, the outer boundary of which is a mold surface and the inner boundary of which is a hollow core pin. The parison is then removed to a blow mold wherein the parison is expanded to the shape of the blow mold by directing a fluid, such as air, against the inner surface of the parison, thereby causing an expansion of the parison.

It has heretofore been found extremely difficult, and accordingly commercially impractical, to produce by injection molding a parison which has properties such that it will be readily, and reliably blowable. Various factors have been found to contribute to this effect and these will now be enumerated.

In the first place, of course, a parison, in order to be blown must be a complete, closed unit with a continuous wall. Since parison forming cavities are often long and constricted it is not infrequent that a situation is found where the plastic material sets up prematurely and the parison fails to be completed during injection, so that inflation in naturally impossible.

Again the parison material, when in the heated condition, must have sufficient strength and tenacity to accommodate itself to the unpredictable shifting strains of inflation and not rupture locally during the process.

In the third place the parison must be hot enough to expand and shape itself to the blow mold without generating excessive stresses within the material itself during inflation.

In the fourth place the parison must have a sufficiently small temperature variation throughout, and especially along the longitudinal axis, to insure a substantially uniform stretchability as it is inflated. While the degree of permissible variation is not known exactly, my current investigations lead me to the conclusion that if the parison temperature variation does not exceed a maximum of about 50° F. it can be blown quite readily. This is ordinarily difficult to achieve because of the usual, long, constricted shape of the parison cavities.

To give a satisfactory end result, the hollow in the parison must have reasonable concentricity, i.e., its longitudinal axis must be reasonably near coincidence with the longitudinal axis of the parison outer surface, or there will be a weak side which tends to blow out first, thin out excessively in one locality and thus result in a non-commerical product. Again the high length to diameter ratio frequently encountered contributes to this effect since a long core member, unsupported at one end is difficult to control and keep centered during injection as will hereinafter appear.

The five properties noted above combine to distinguish a parison which can be blown in an efficient manner to provide a commercial result, and hereinafter a parison embodying these properties will be designated and referred to as a "readily blowable parison."

Commercially, the prior art methods of injection-blow molding plastic containers have met with extremely limited success for another reason. This has been the tendency of the plastic material, heretofore considered usable in the injection molding operation, to develop failures known as environmental stress cracks. When employing plastic containers for detergents or other wetting agents, there often occurs a type of failure which seems to arise from some property of the detergent or wetting agent permitting it to seek out the lines of weakness and ultimately, within the normal storage and use period of the container, cause the container to fail, with consequent leakage of the contents through the walls of the container.

Additionally, the prior methods of injection-blow molding, as worked out in practice, have failed for various reasons to produce a plastic container in which the wall thickness of the blown article, at preselected areas of the container along its longitudinal axis, can be varied, made uniform, or otherwise controlled according to the desired result.

Furthermore, the injection-blow method has proved to be quite restricted in its application. As heretofore mentioned, articles of any substantial length were progressively more difficult to make successfully because a long cantilivered core pin suffers from limberness in proportion to its length, and even when its initial centering is fairly accurate, it tends naturally to deflect to an off-center position away from that side where the plastic first penetrates the mold. For this reason, as a practical matter it has been heretofore found unworkable to hold properly centered in the injection cavity any core pin having a length to diameter ratio of greater than about 7:1.

Finally, in the case of injection-blow molding there has sometimes been encountered difficulty in separating the parison from the core pin, especially when the plastic must be maintained at fairly elevated temperatures. It appears that because of the elevated temperature of the plastic and the core pin which it surrounds, there is a tendency for the plastic to adhere to the pin. Futhermore, in the interval between injection molding and blowing, the outer surface of the parison cools to some degree with the result that the peripheral plastic material shrinks and apparently tends to compress the inner material around the core, and aggravate this tendency to adhere. Whatever the actual explanation, the problem of smoothly and uniformly separating the parison from the core pin surface by fluid pressure is a real one and until the present invention has apparently been one strong deterrent to the use of the injection-blow method.

It is an object of the present invention, therefore, to manufacture hollow, thin-walled plastic articles, especially of material having the physical properties of polyethylene, wherein the wall thickness can be controlled as desired, either so as to have substantially uniform thickness of walls throughout regardless of article shape, or so as to dispose the thickness variations in the final article according to a predetermined desired plan.

Another object of the invention is to produce by an injection method a parison which has the properties necessary to make it readily blowable.

Another object of the present invention is the production of hollow, thin-walled plastic articles by an injection-blow method, but overcoming the usual stress-cracking tendencies of articles thus produced.

Another object of the present invention is the production of hollow, thin-walled plastic articles by an injection-blow method which avoids the difficulties of obtaining separation of the parison from its core pin during blowing as heretofore encountered.

A further object of the invention is the production of a parison of improved shape whereby the material distribution in the finished article can be effectively controlled.

Still a further object of the invention is the provision of shaped hollow plastic articles by a blowing process, wherein the wall thickness of the article bears a direct rather than an inverse relation to the distance of the wall from the longitudinal axis.

In accordance with the present invention I have discovered a method for forming organic plastic containers which avoids the disadvantages of the prior injection-blow molding processes and produces a novel plastic container structurally superior to the blown plastic containers of the prior art, by whatever method produced.

Generally considered, the process involves the formation of a hot parison by injecting plastic organic material having specific flow characteristics and blow strength into a parison mold cavity, the shape of the cavity defining sections or zones along its longitudinal axis related in a novel manner to the ultimate shape of the blown article, and the injection step being carried out under carefully controlled temperature and pressure conditions making possible proper filling of the cavity; rapid removal of the parison to the blow mold; and inflation of the parison therein to contact the walls of the mold by directing a fluid at high velocity against the inner surface of the parison.

Additional objects, features and advantages will appear hereinafter as the description proceeds.

In the drawing:

FIG. 7 is a longitudinal broken section to an enlarged scale showing the blow mold of FIG. 2 and illustrating the parison completely blown to the final form;

FIGS. 8 and 9 are respectively longitudinal and transverse sections illustrating a parison of slightly different shape in place within a blow mold of corresponding cavity configuration, with the resulting container indicated in dotted lines, the section of FIG. 9 being taken substantially on line 9—9 of FIG. 8;

FIG. 10 is a section taken substantially on line 10—10 of FIG. 8; and

FIG. 11 is a section taken substantially on line 11—11 of FIG. 8.

Figure 1:
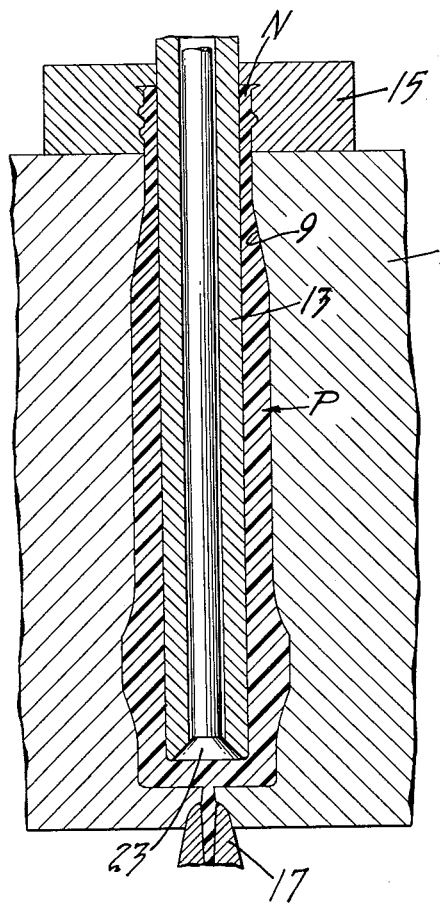
FIG. 1 is a longitudinal section of a parison mold illustrating the formation of a parison by injection molding in accordance with the present invention.
Figure 2:
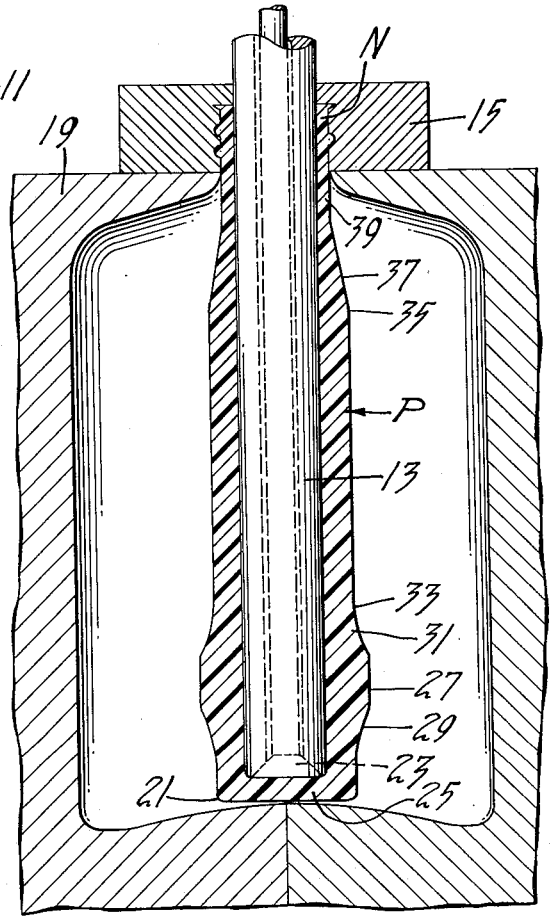
FIG. 2 is a longitudinal section of a blow mold showing the parison and core pin of FIG. 1 transferred thereto, but prior to blowing.

Considering each of the step-wise operations in their order of occurrence, and referring to the drawing herein, the novel process of this invention will now be described.

For convenience, the following description will discuss the process in terms of forming a plastic container, though it is to be understood that the process is equally adaptable for the formation of hollow organic plastic articles, generally.

*Formation of Parison*

The initial step comprises the injection of the plastic material into a cavity 9, the outer surface of which is a parison mold 11 and the inner surface of which is a centrally disposed hollow core pin 13. The cavity defined by the mold and the core pin may also be shaped to provide the neck piece N for the container including, if desired, appropriate helical groovings for registering the neck piece with a screw cap. Or, as in the preferred form shown the neck piece may be formed by extending the cavity into a separate and detachable neck mold 15. The latter is the preferred practice for the reason that the neck mold serves as a portion of the carrying means to convey a parison from the injection mold to the blow mold and, furthermore, employing a separate mold for the neck piece allows the container neck piece to be cooled during the blowing operation by providing heat exchange means within the neck mold. Since the neck piece N is usually of greater thickness than the body of the container and consequently requires a longer cooling period before discharge from the mold, advantage may also be taken of the preblowing and post-blowing transfer periods as well as of the blow molding period to cool the neck piece by contact with its mold, so that the container may be moved about freely in the fabricating process without critical regard for the time required to cool the neck to a set condition. Moreover, the neck mold 15 serves as a firm anchor for the upper end of the parison as it leaves the injection mold and proceeds to the blow mold. The natural tendency of the parison to shrink lengthwise during this interval could, if the neck were released, destroy the parison proportions and prevent its proper registry with the blow mold parts upon arrival.

In the past, the organic plastic material used in injection molding has been what is termed "injection grade," that is the material at standard injection temperatures and pressures is readily flowable and substantially less viscous than the plastic material known as "extrusion grade."

Formerly, it was deemed impossible to inject extrusion grade plastic material and produce a satisfactory parison. The difficulty has been to cause the extrusion grade material to flow properly into a deep constricted cavity such that there are no voids within the cavity. While injection grade material can be readily flowed into the cavity, it has, when in the hot, partially molten condition, poor properties of strength and tenacity. Consequently attempts to blow such a parison often fail because of a breach in the bubble before the article is fully formed.

I have found, however, that contrary to expectations, extrusion grade plastic materials may be injection molded under certain controlled temperature and pressure conditions to produce an excellent readily blowable parison. For example, satisfactory parisons have been formed from extrusion grade linear polyethylene.

As a particular example, linear polyethylene is generally considered as being of injection grade if it has a high melt index, on the order of 0.5 and upwards, while it is considered as being of extrusion grade if it is characterized by a low melt index on the order of 0.5 and below. A rule of thumb in common use is that stress crack resistance in packaging detergents or other wetting or stress-cracking agents is clearly insufficient in linear polyethylene having a melt index above 0.3. I have produced containers that are satisfactory for the storage of detergents when using extrusion grade linear polyethylene having a melt index no greater than 0.5, but the preferred melt index for this purpose is 0.2–0.3. According to the known prior art, therefore, the only material sufficiently resistant to stress cracking to be available for blowing detergent containers, would be notably lacking in the qualities essential for injection molding the parison and hence, resort to extrusion-blow methods would be clearly indicated.

I have discovered, however, that the manner in which the linear polyethylene is handled and treated has an important effect upon its injectability not heretofore appreciated, and that under certain particular conditions it is in fact possible to injection mold a readily blowable parison using linear polyethylene material heretofore considered to be of strictly extrusion grade. I have also discovered, moreover, that linear polyethylene of extrusion grade enjoys certain very worthwhile properties from the standpoint of being able to be blown in a regular and reliable manner and is noticeably better in certain respects than injection grade material in this regard, so that when my novel process is employed, it is in fact preferable to use material of strictly extrusion grade in a blowing process depending upon injection molding of the parison.

As a consequence of the above-noted discoveries, I am enabled to manufacture by an injection-blow process, high quality containers for any purpose, and especially for packaging detergents or other wetting or stress-cracking agents, of linear polyethylene having a melt index of 0.5 and below, preferred material in this range being, in fact, that having a melt index below 0.3

There are sets of coordinate and inter-related circumstances in which such a readily blowable parison can be produced. As an example of the way in which I have accomplished this the following particular set of circumstances is herein set out in detail. The plastic material may be heated and compressed in conventional preplasticizing apparatus. In the case of linear polyethylene of extrusion grade, the material is preheated to a temperature between 450° F.–550° F., before admitting the same to the parison cavity 9. The preheated and compressed polyethylene is injected into the cavity via injection nozzle 17 at an extremely rapid rate as determined by an applied pressure of perhaps 15,000 p.s.i. or upward through a customary injection orifice of about .08 square inch. It is estimated that under these conditions and with the mold 19 at about 200° F. and the core pin 13 at about 220° F., the time required to fill the cavity 9 is very short, not more than 1½ seconds probably, and it may be significantly less.

It will be understood, of course, that none of the foregoing conditions is a rigid requirement in itself, except possibly for the lower limit placed on the material temperature, but that one or more of the conditions can be varied within a noticeable range so long as the others are varied in a compensatory manner to produce a pattern resulting in a parison having the five properties necessary to ready blowability as heretofore outlined.

Aside from the role which the aforesaid rapid injection plays in completely filling the cavity, it also seems to aid in a surprising manner in maintaining the core pin 13 in a concentrically disposed position relative to the inside walls of the surrounding parison mold 11. The concentricity of the core pin 13 is of extreme importance in maintaining the desired wall thickness throughout the parison as previously explained. Since the injected plastic will flow along the path of least resistance, appreciable initial eccentricity of the core pin would allow the plastic to flow more rapidly into areas of greater cross-sectional dimension and hinder uniform flow about the core pin. Furthermore, the formation within the cavity 9 of plastic material, non-uniform in any given horizontal cross-section, would create a lateral pressure against the core pin thereby compounding any initial eccentricity of the core pin 13. I have found that by rapidly injecting the plastic material, i.e. admitting the plastic to the cavity under unusually high pressures, that an eccentricity no greater than 0.01–0.02 inch can be regularly achieved at the tip of a core pin whose length to diameter ratio is as much as 10:1.

After the injection operation is completed, there is found in the cavity 9 a hot readily blowable plastic parison P (which includes the neck piece N). This parison P is transferred to a blow mold 19 for the blowing operation. By conducting this transfer on the same core pin used for injection with the neck mold still in place, the parison shape and size is safeguarded even though the parison is at an elevated temperature where deleterious axial shrinkage or sagging would otherwise occur.

*Parison Shape*

As one aspect of this invention, I have discovered a way of predetermining and controlling the wall thickness of any given area of a blown container. This control is achieved by constructing the parison P in an unusual manner such that a given horizontal section along the length of the parison will correlate with or become a predetermined but heretofore unexpected portion of the blown container. Thus, by correctly correlating of the respective portion of the parison with a part of the finished product, and varying the thickness of the correlating section of the parison, a preselected wall thickness can now be incorporated into the final blown product.

Contrary to past belief, I have discovered that corresponding parts of the parison do not in all cases form corresponding parts of the container, i.e. for example, the bottom corner 21 of the parison does not form the bottom corner of the ultimate container. Thus, the bottom corner of the parison should normally be much thinner than that portion of the parison P that will provide the plastic material for the bottom corner of the container.

Viewing the parison P in a vertical position as shown, it will be understood that the core pin 13 is arranged so that the expanding fluid is introduced by means of a valve 23 against the bottom of the parison. By blowing the parison in a manner as hereinafter described in detail, it appears that the bottom portion of the parison is first expanded to form the bottom of the blown container. Subsequently, by continuing the blowing action, the remainder of the parison P seems to be peeled from the core pin 13 in a smooth flowing pattern and ultimately unfolds against the mold wall and is firmly held thereagainst by the fluid pressure. This series of operations which is thought to be performed during parison inflation can best be seen in FIGS. 3 to 7.

By this peeling and unfolding action, the plastic material moves from the core pin to a predetermined, albeit unexpected, position on the inner face of the blow mold. By thus properly understanding the flow pattern from core to mold, and knowing where the parison parts will ultimately arrive, it is possible to construct the parison in such a way that the section of the parison that must traverse the greatest distance to reach a given area of the mold surface is the thickest. Likewise, the thickness of other sections of the parison may be varied depending upon the distance to be traversed. Furthermore, with the positioning control afforded by this invention, the relative thickness of any particular section in the blown article may quite accurately be predetermined. Thus, if it is desired to blow a container wherein the wall at the top area near the neck is thin relative to the base section, this may be accomplished by varying the thickness of the plastic material along the length of the core pin.

Referring to FIGS. 2 through 7 it can be seen that the parison of the invention has a special shape related to the shape of the final container which, for the purposes of the immediate discussion, is assumed to be generally cylindrical. In the first place the parison P has a bottom cap portion 25 which includes the corner 21, all of which is preferably of as thin a wall as possible considering that it is usually desirable to inject the hot plastic from this lower end of the parison mold, and that the thickness of this wall determines the access area for all the plastic material which must reach upper portions of the cavity 9 and, therefore, the wall thickness must be adequate for this purpose in addition to its own thickness requirements. Just above this cap 25 is a noticeable bulge 27 which is merged into the balance of the parison by taper sections 29 and 31. A main wall portion extends from thence starting at a point 33 upwardly at a substantially constant diameter to a point 35 where there is a pronounced taper 37 to a thin-walled section 39 leading into the neck piece N.

In the drawings the points and parts of the expanding parison bear the same reference numerals in all views except with a progressively increasing number of prime marks to indicate their new positions. Likewise the wall thicknesses shown are exaggerated in relation to the size of the container in order to illustrate more clearly the important degree of wall thickness control exercised by following the present method.

Figure 3:
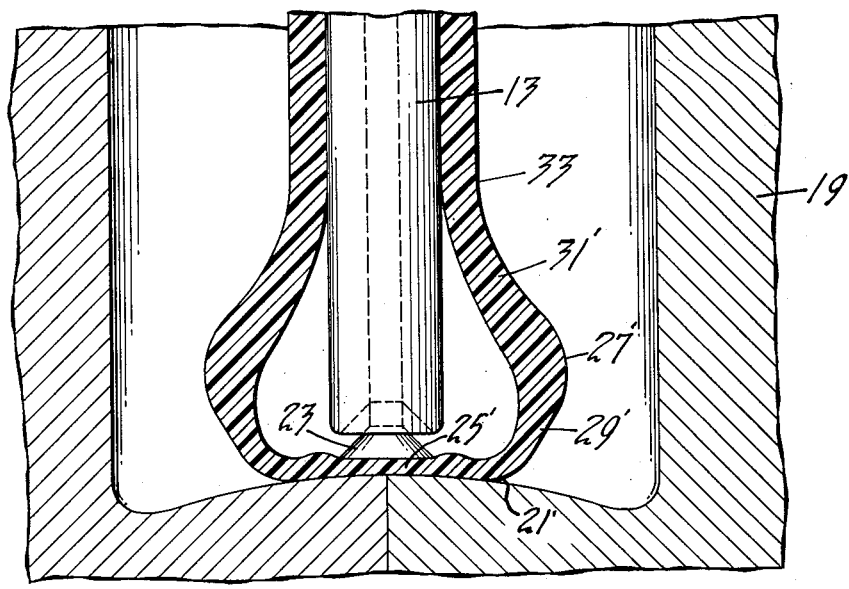
FIG. 3 is a fragmentary section showing the lower portion of the blow mold of FIG. 2 to an enlarged scale and illustrating an early stage in the inflation of the parison.
Figure 4:
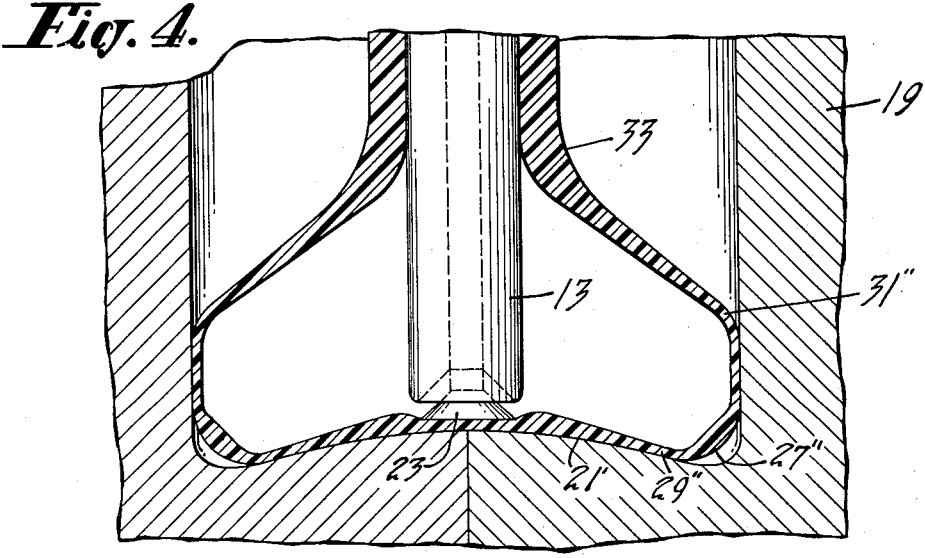
FIG. 4 is a fragmentary section showing the lower portion of the blow mold of FIG. 2 to an enlarged scale and illustrating a second stage in the inflation of the parison.
Figure 5:
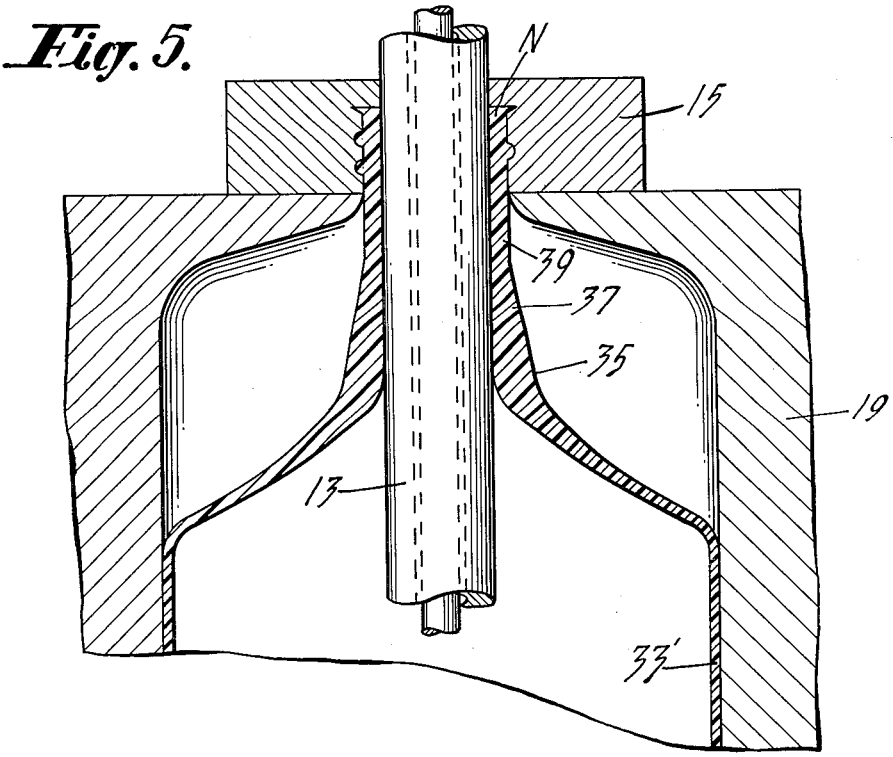
FIG. 5 is a fragmentary section showing the upper portion of the blow mold of FIG. 2 to an enlarged scale and illustrating a third stage in the inflation of the parison.
Figure 6:
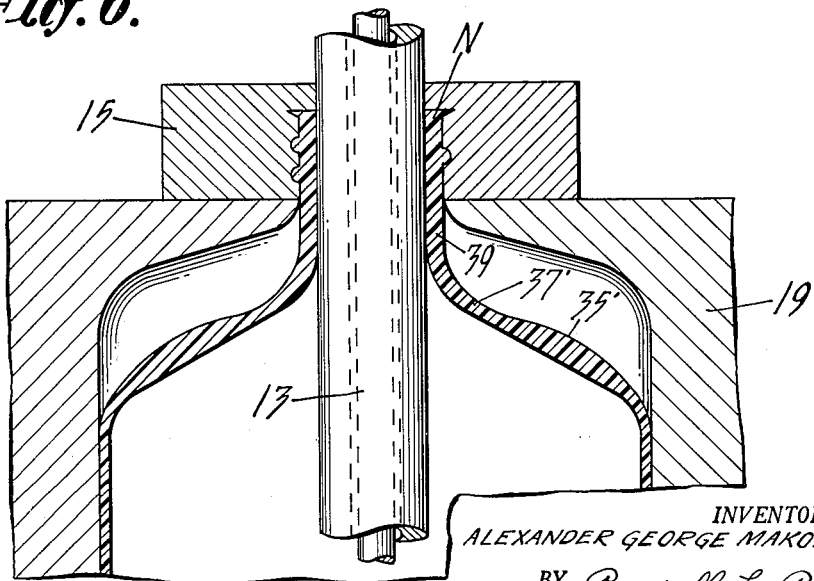
FIG. 6 is a fragmentary section showing the upper portion of the blow mold of FIG. 2 to an enlarged scale and illustrating a late stage in the inflation of the parison.

Thus it can be seen from FIG. 3 that as the parison starts to move the cap portion 25 almost immediately touches the bottom of the mold 19 with only very little expansion, and stays as thus positioned at 25'. A small bubble is also being formed on the end of the parison so that the crest of the bulge 27 is swung out to 27'. In FIG. 4 the blowing has now progressed to a point where the crest of the parison bulge 27 has swung out and fitted itself partly into the lower corner of the mold 19 as at 27" and the bubble has started to travel up the side wall of the mold. From here on the plastic material of the main wall portion 33, 35 is progressively stripped from the core pin 13 and laid in a stretched condition upon the side wall of the mold 19 by the expanding bubble as shown in FIG. 5. As seen in FIG. 6 the point 35 is stripped from the core pin 13 and this portion of the parison is, by a combined process of stretching and swinging about the base of the neck piece N, being transferred to the surface of mold 19. The new position of point 35 is indicated at 35'. Beyond this point the section 37 has been swung out to 37' and, it together with section 39 will, as is apparent from FIG. 7, swing up against the container breast with some stretching mainly in the peripheral portions to place the point 35 of the parison into the corner of the shoulder as indicated at 35", and the portions 37 and 39 of the parison against the breast portion of the mold wall at 37" and 39'. The final application of the fluid pressure urges any of the spanning portions of the parison into sharp configurations, such as shown at the bottom corner in FIG. 7 where the parison material finally reaches the position 27''' and the container formation is complete.

The foregoing description taken with the applicable drawings illustrates several important principles relating to this invention. It was assumed in the described instance that it was desirable to have the walls of the container as uniform as possible except for the neck piece N and perhaps a slightly thickened bottom corner for more stiffness to provide perfect operation on mechanical apparatus such as filling lines. It was shown that this may actually be achieved in substance by preparing a parison with a bulge spaced upwardly from the bottom end in a position where the bulge material can with slight stretching swing down into the bottom corner, and wherein the upper portion of the parison for an appreciable length below the neck section is significantly thinned to provide an area which can, with slight peripheral stretching, be laid up onto the breast wall to give approximately the desired thickness at that location.

It is also an important principle that the core pin should be of such length as to place the lower surface of the parison rather close to the surface of the bottom of the blow mold cavity, and if this feature is overlooked other elements of parison shaping lose their effectiveness and all control of the distribution of the material may be lost if, indeed a container can be blown at all.

By following the foregoing principles of parison shaping I have found that it is possible to make a blown plastic container whose wall thickness (except for predetermined local areas such as neck portions which may be intentionally strengthened, and certain other limited areas which require added thickness for reasons of parison formation as will hereinafter appear) shows a variation no greater than that represented by a ratio of 7:4 between the thickest and thinnest portions, and often less. This is in striking contrast to the blown plastic containers made by previously known methods wherein the corresponding thickness variation is almost never less than that represented by a ratio of 4:1 between the thickest and thinnest portions intended to be of uniform thickness. What is perhaps even more significant, by the present process it is possible to obtain containers with strong rigid lower corners at the same time maintaining the sidewalls as thin as desired. According to all processes heretofore known these corners were customarily exclusively thin and necessitated increasing overall bottle wall thickness until the lower corners would provide minimum usable stiffness.

*Blowing Operation*

After the parison has been formed by injection molding in a shape determined in accordance with the foregoing principles, it is rapidly removed to a blow mold, wherein the inner surface of the parison is subjected to fluid pressure to cause expansion of the plastic material to the contour of the blow mold.

Inasmuch as the plastic material must be maintained at an elevated temperature in order to expand same, it is essential that the transition of the parison from the injection mold to the blow mold be effected without undue cooling of the plastic. I have found that linear polyethylene can be successfully blown according to my novel method provided the temperature of the polyethylene in the blow mold is not below 325° F. Preferably, the temperature should be maintained at 375° F.–425° F., and the high initial injection temperature heretofore stated, taken together with the rapid filling of the parison mold, in addition to making possible an effective injection action with extrusion grade material, also expedites this transfer of the parison to the blow mold without any necessity for complicating delays to reheat the parison. For example, a parison formed of extrusion grade linear polyethylene injected at a temperature of at least 450° F., by the process hereinbefore described, in 1½ seconds and transferred to the blow mold in about 3 seconds, will be found to be in a good readily blowable condition at that time. Under these conditions the temperature variation along the parison will not exceed 50° F., and both ends of the parison temperature range will normaly be within the limits of 325° F. to 425° F. heretofore mentioned.

In a preferred form of the invention the parison length is so designed as to place its lower surface substantially in contact with the interior of the blow mold whereby the tiny protruding rudimentary sprue of plastic left from the injection process will be caught and flattened between the blow mold halves to assist in holding the parison firmly and accurately centered during the initial stage of blowing.

After the parison is positioned in the blow mold a fluid, such as air, is directed against the bottom of the parison at a velocity much higher than that ordinarily used in plastic article blowing. Usually, the air is admitted through a valve such as 23 positioned at the bottom of the core pin and the above noted centering effect may be alternatively achieved or augmented if desired by causing the injection valve 23 to travel downwardly sufficiently during opening to grip the plastic of the bottom wall 25' firmly between itself and the bottom of the blow mold as seen in FIGS. 3, 4 and 7.

Perhaps the best definition of the fluid velocity needed to properly effect the peeling and unfolding action described above and reliably provide perfect containers is a velocity produced by a source of air pressure at a minimum of 60 pounds per square inch (and preferably at about 120 pounds per square inch), admitted to the parison through a passage whose smallest restriction is about .003 square inch. It will be understood that these values are of no significance in themselves but merely serve as a handy definition for a particular air admission velocity.

After the air has been admitted in accordance with the above-named conditions, the parison becomes inflated against the walls of the cavity to provide the shape C, FIG. 7, which when cooled constitutes the completed container. Referring to FIG. 7 it can be seen that certain parts of the completed container C are slightly thicker than the rest of the container wall. One of these, of course, is the neck portion N which is molded thicker by express design and as dictated by desired qualities such as neck stiffness needed in the finished container. Also, two other restricted areas, namely a central area at the bottom indicated by the numeral 21' and an upper shoulder portion 39' near the neck will generally display a wall thickness slightly greater than that of the balance of the container wall. These areas result from a particular design of the parison shape contrived as an aid to the proper injection molding of the parison. In other words, if the parison is to be properly formed, adequate cross sectional area for speedy plastic ingress needs to be provided first at the lower parison corner 21 and also at the entrance to the remote neck portion N which displays a critical and complex mold configuration that must be reliably filled. It will be appreciated from the foregoing description that in theory the parison cross-section at 39 could be reduced to substantially the ultimate wall thickness desired at 39'. However, to insure reliable filling of the neck section N during injection, the best means of currently practicing the invention calls for this constricted portion of the parison to have a cross sectional area not too much smaller than that of the neck section itself. These areas of the container (i.e. 21' and 39'), however, are not so extensive as to have a serious effect upon the overall weight and material consumption of the container, and together with the neck and lower corner may be, for practical purposes overlooked in assessing the essential wall thickness characteristics of the container. It is pointed out that the wall thickness of the container other than the portions mentioned is extremely uniform and shows in practice a variation no greater than that represented by a ratio of 7:4 between the thickest and thinnest parts. This variation, and the wall portions involved, determined without reference to the parts intentionally designed with extra thickness as explained above, may be referred to for convenience as the "essential wall thickness variation" and "the essential wall portions" respectively, and will be so designated and referred to hereinafter.

*Alternate Parison Forms*

While the form of the parison P hereinbefore described was particularly related to the solution of the problem of providing a thin-walled bottle as nearly uniform in wall thickness as possible, it will be appreciated that the principles of the invention can be applied in such a way as to make bottles in which the material is distributed about the bottle in varying wall thickness according to a desired pattern. One possible arrangement, for example, would be to provide a parison so constructed that the completed container would have a thicker bottom and base portions, with the wall thickness tapering off, either gradually or in steps towards the top or neck of the container. Such a result has not been heretofore attained, since the prior processes inherently produced relatively thin base corners, and, in order not to compel use of prohibitive amounts of material in the side wall, the lower corners were often slightly defective or, at best, quite marginal in the quality of rigidity.

As an example of one form of container which can be achieved and the starting parison therefor, reference is had to FIGS. 8 to 11 of the drawing. Here the parison PP is shown on core pin 113 disposed within the blow mold 119 and neck mold 115. The blow mold has a cavity shaped to provide a container of somewhat hourglass shape, i.e. reduced slightly in the mid-section, to form a waist and larger at the ends, and with a plan section at any particular level which has a larger axis in one direction than in the other. It is assumed to be the intent in this instance to construct the container with fairly thick bottom and lower corners, side walls tapering to a thin waist, and then thickening slightly to the shoulders with a rather thin top surface or breast. The parison PP designed to produce this container is distinguished by having a bottom cap 125 with a bottom corner 121, a bulge 127, sloping sections 129 and 131 leading into the bulge, and a main wall portion extending from point 133 to point 135. Here instead of being cylindrical, the main wall portion is slightly hourglass shape and terminates at the crest of an upper or secondary bulge as can be seen from FIG. 8. The minimum diameter section of the main wall portion is designated by numeral 164. From point 135 the parison tapers upwardly into a noticeably reduced breast forming section 137 and ultimately enlarges slightly to meet the neck section NN.

As can be seen in FIGS. 9 and 10 the parison is not exactly circular in cross section but has cross sections with a major and minor axis, the former being disposed in the direction of the major axis of the container cavity. This non-circularity preferably extends throughout most of the length of the parison but disappears, of course, at the base of the neck portion NN.

In the preferred form shown the bulge 127 instead of extending uniformly about the parison, deviates downwardly at the ends of the minor axis of the cross section as can be seen at 227 in FIG. 9. This feature causes the thickest parts of the parison to be placed in the bottom corners of the cavity of blow mold 119. Similarly the secondary bulge at 135 has a high point of deviation 235 at the ends of the minor axis as can be seen in FIG. 11 so as to place the thickest portion of the material in the bottle shoulder. It will be understood, of course, that this is a refinement which is not entirely essential to the effective use of the invention, for the bulges may be so designed as to have a spread sufficient to cover the corner location of the blow mold adequately even though there is some variation in its remoteness from the core pin.

When the parison PP is inflated, there results a container CC of the proportions indicated by dotted lines in FIGS. 8, 9 and 11 wherein the portions corresponding to designated parts of the parison PP are designated by the same numerals as used on the parison, but with a prime designation appended.

This container CC, moreover is notable in that it has a property not found in prior known shaped containers. Heretofore it has been common and usual to find as the thickest parts of the side wall corner and shoulder areas of containers, those parts which had to travel least from their initial position or from the parison axis, while those parts which had to travel farthest were the thinnest. According to the present invention as seen in FIG. 8, a directly opposite effect can now be achieved. Now (again considering the side wall, corner and shoulder areas), it is possible to construct a container by blowing, wherein those parts which are most remote from the parison axis are thicker than those which are less remote.

While the drawings, in order to adequately illustrate the proportions of the parison and container especially with regard to wall thickness, have necessarily been somewhat exaggerated, it will be understood that the wall thicknesses of the container will normally be much thinner than those shown, and for linear polyethylene will frequently be of the order of 0.03 inch in the major wall areas.

From the foregoing description it can be seen that I have provided a novel thin-walled blown plastic container or article wherein the wall thickness at the bottom and shoulder corners is at least as great as that at all points in the essential wall portions of the container, and that I have also provided a container such that the essential wall thickness variation of blown portions of the container does not exceed that represented by a ratio of 7:4 between the thickest and thinnest portions when wall thickness uniformity is the object. Furthermore, I have developed a novel method and a novel parison design by which it is possible to achieve phenomenally accurate control of wall thickness distribution in blown containers or articles and thus to produce the novel container above described.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. The method of forming hollow articles of organic plastic material comprising plasticating an extrusion grade organic plastic material having a low melt index, injection molding said plastic material by admitting the same at a temperature of 450° F.–550° F. and at a high pressure through an orifice into a cavity, the outer boundary of which is the inner surface of a mold and the inner boundary of which is the outer surface of a core pin which is substantially concentrically disposed with relation to the inner surface of the mold to form a parison, the said temperature, high pressure and orifice size being at combined values such that cavity filling is completed rapidly, removing the formed parison to a blow mold and therein blowing said parison to the contour of the blow mold.

2. The method of forming hollow articles of organic plastic material comprising plasticating an extrusion grade organic plastic material having a low melt index, injection molding said plastic material by admitting the same at a temperature of 450° F.–550° F. and at a high pressure through an orifice into a cavity, the outer boundary of which is the inner surface of a mold and the inner boundary of which is the outer surface of a core pin which is substantially concentrically disposed with relation to the inner surface of the mold to form a parison, the said temperature, high pressure and orifice size being at combined values such that cavity filling is completed rapidly, removing the formed parison to a blow mold and therein blowing said parison to the contour of the blow mold by directing a fluid against the bottom of the parison at a velocity represented by a source of fluid under pressure of at least 60 p.s.i. metered through an opening not less than .003 square inch in cross section, while maintaining the parison at a temperature of at least 325° F.

3. The method of claim 1, wherein the material is linear polyethylene having a melt index of no greater than 0.5.

4. The method of claim 1, wherein the melt index of the organic plastic material is 0.2–0.3.

5. The method of claim 2, wherein the temperature of the parison during the blowing is maintained between 375° F.–425° F.

References Cited in the file of this patent

UNITED STATES PATENTS

| | | |
|---|---|---|
| 2,315,478 | Parkhurst | Mar. 30, 1943 |
| 2,632,202 | Haines | Mar. 24, 1953 |
| 2,657,431 | Slaughter | Nov. 3, 1953 |
| 2,715,751 | Weber | Aug. 23, 1955 |
| 2,789,312 | Borer | Apr. 23, 1957 |
| 2,810,934 | Bailey | Oct. 29, 1957 |
| 2,852,054 | Motley | Sept. 16, 1958 |
| 2,876,818 | Raff et al. | Mar. 10, 1959 |
| 2,953,817 | Miller et al. | Sept. 17, 1960 |
| 3,001,239 | Santelli et al. | Sept. 26, 1961 |

FOREIGN PATENTS

| | | |
|---|---|---|
| 882,497 | France | June 4, 1943 |
| 1,046,602 | France | Dec. 8, 1953 |
| 1,091,090 | France | Apr. 6, 1955 |
| 485,167 | Italy | Oct. 3, 1953 |